United States Patent
Kim et al.

(10) Patent No.: US 8,356,230 B2
(45) Date of Patent: Jan. 15, 2013

(54) APPARATUS TO MANAGE DATA STABILITY AND METHODS OF STORING AND RECOVERING DATA

(75) Inventors: Hotae Kim, Seoul (KR); J. Seo, Suwon-si (KR); Won-il Kim, Suwon-si (KR); Sung-jae Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 931 days.

(21) Appl. No.: 12/431,859

(22) Filed: Apr. 29, 2009

(65) Prior Publication Data

US 2010/0077283 A1  Mar. 25, 2010

(30) Foreign Application Priority Data

Sep. 23, 2008  (KR) .................. 10-2008-0093235

(51) Int. Cl.
*G06F 11/00* (2006.01)
(52) U.S. Cl. ........................ 714/763; 714/805
(58) Field of Classification Search .................. 714/763, 714/765, 764, 766, 769, 700, 805, 803
See application file for complete search history.

(56) References Cited

U.S. PATENT DOCUMENTS

| 6,018,806 | A | 1/2000 | Cortopassi et al. | |
| 7,188,278 | B1 | 3/2007 | Diaz et al. | |
| 2001/0052051 | A1* | 12/2001 | Kim et al. | 711/114 |
| 2004/0179386 | A1* | 9/2004 | Jun | 365/145 |
| 2008/0126912 | A1* | 5/2008 | Zohar et al. | 714/763 |
| 2011/0179412 | A1* | 7/2011 | Nakae et al. | 718/1 |

FOREIGN PATENT DOCUMENTS

| JP | 57-117197 | 7/1982 |
| KR | 20-1998-0068699 | 12/1998 |
| KR | 10-2001-0019732 | 3/2001 |
| KR | 10-2002-0024227 | 3/2002 |

* cited by examiner

*Primary Examiner* — Dieu-Minh Le
(74) *Attorney, Agent, or Firm* — NSIP Law (57) ABSTRACT

An apparatus to manage data stability, including a plurality of storage units and a control unit to determine when protected data is stored in a particular address row of at least one of the plurality of storage units, to select another storage unit of the plurality of storage units to store the protected data, and to store relevance data related to the protected data in the same address row of the selected storage unit. Methods of storing and recover data also included.

16 Claims, 7 Drawing Sheets

(Status Information)

| Address Row | First Block | Second Block | ... | mth Block |
|---|---|---|---|---|
| First Address Row | 0 | 0 | ... | 0 |
| Second Address Row | 1 | 1 | ... | 1 |
| Third Address Row | 0 | 2 | ... | 0 |
| ⋮ | ⋮ | ⋮ | ⋮ | ⋮ |
| (n-3)th Address Row | 0 | 0 | ... | 0 |
| (n-2)th Address Row | 0 | 1 | ... | 0 |
| (n-1)th Address Row | 1 | 1 | ... | 2 |
| nth Address Row | 1 | 2 | ... | 2 |

0:Protected Data     1:Non-protected Data     2:Unused

FIG. 6

(Address Row Information)

| Address Row | Type |
|---|---|
| First Address Row | 0 |
| Second Address Row | 1 |
| Third Address Row | 0 |
| ⋮ | ⋮ |
| (n-3)th Address Row | 0 |
| (n-2)th Address Row | 0 |
| (n-1)th Address Row | 1 |
| nth Address Row | 1 |

0:Protected Data   1:Non-protected Data

APPARATUS TO MANAGE DATA STABILITY AND METHODS OF STORING AND RECOVERING DATA

CROSS-REFERENCE TO RELATED APPLICATIONS

This application claims the benefit under 35 U.S.C. §119(a) of Korean Patent Application No. 10-2008-93235, filed Sep. 23, 2008, the disclosure of which is incorporated herein in its entirety by reference.

BACKGROUND

1. Field

The following description relates to data processing technology, and more particularly, to an apparatus to dynamically manage data stability methods of storing and recovering data.

2. Description of the Related Art

Various techniques have been researched regarding the recovery of data damaged by a fatal error, including both physical and logical errors, in data storage devices.

For example, one technique may include storing original data in a storage device that may be regularly or irregularly backed up to another storage device to safeguard data recovery in the instance when the original data is damaged so the back-up data may be used for recovery.

Another technique may include simultaneously storing data in two storage devices to safeguard data recovery in the instance when data in one storage device is damaged so the data stored in the other storage device may be used for recovery.

A current and widely used technique may include distributed storage technology that distributes and stores data in a plurality of storage devices to safeguard data recovery in the instance when data is damaged in a distributed storage technology system. However, this data recovery method requires numerous backup storage devices to recover the data. Conventional data backup methods may not use memory efficiently because they may include storing both data to be safely protected (hereinafter, referred to as "protected data") and data which may be damaged or deleted without consequence (hereinafter, referred to as "non-protected data").

A need exists for technology that manages data stability having a simple configuration and enables damaged data stored in a particular storage unit to be effectively recovered in a system including a plurality of physically and/or logically divided storage units.

SUMMARY

In one general aspect, an apparatus to manage data stability includes a plurality of storage units; and a control unit to determine when protected data is stored in a particular address row of at least one of the plurality of storage units, to select another storage unit of the plurality of storage units to store the protected data, and to store relevance data related to the protected data in the same address row of the selected storage unit.

The control unit may include a plurality of individual managing units respectively coupled to the plurality of storage units to control address rows of each of the plurality of storage units; and a virtualization managing unit to control each of the plurality of individual managing units and to manage the plurality of storage units by virtualizing the plurality of storage units as a single device.

The control unit also may include an address row managing unit which to manage the address rows of each of the plurality of storage units dynamically by classifying the address rows into protected rows and non-protected rows.

When there is damaged data in a particular address row of one of the plurality of storage units among the protected rows managed by the address row managing unit, the virtualization managing unit may recover the damaged data using the relevance data stored in the same address row of another storage unit.

The plurality of individual managing units may dynamically manage status information configured to indicate whether data stored in each address row of each storage unit is protected, non-protected, relevance data, and whether the address row is unused.

The relevance data may be parity information. The parity information may be stored in a particular address row of one storage unit and may be obtained by performing an exclusive OR operation on data included in the same address row of the other storage units.

In another general aspect, a method of storing data in a data stability management system includes determining by a data stability managing apparatus when data requested to be stored is protected data; selecting by the data stability managing apparatus one of a plurality of storage units when data requested to be stored is protected data and storing the protected data in an address row that is set to be protected from among a plurality of address rows of the selected data storage unit; and selecting by the data stability managing apparatus another storage unit when the protected data is stored and storing relevance data related to the protected data in a protected address row of the other storage unit corresponding to the protected address row where the protected data was stored of the selected data storage unit.

The relevance data may be parity information. The parity information may be stored in a particular address row of one storage unit and may be obtained by performing an exclusive OR operation on data included in corresponding address rows of the other storage units.

The protected data may be stored in an unused memory block of the address row set to be protected of the selected storage unit.

In another general aspect, a method of recovering data includes determining by a data stability managing apparatus when damaged data is stored in a particular protected address row of one of a plurality storage units; extracting data by the data stability managing apparatus to be stored in the particular address row when stored damaged data exists in the storage unit by analyzing the relevance data stored in a corresponding address row of another storage unit of the plurality of storage units and analyzing intact data stored in a corresponding address row of remaining storage units of the plurality of storage units where non-damaged data is stored.

The relevance data may be parity information. The parity information also may be stored in a particular address row of one storage unit and may be obtained by performing an exclusive OR operation on data included in the same address row of the other storage units.

Other features and aspects will be apparent from the following description, drawings, and claims.

BRIEF DESCRIPTION OF THE DRAWINGS

Throughout the drawings and the detailed description, unless otherwise described, the same drawing reference numerals will be understood to refer to the same elements, features, and structures. The relative size and depiction of these elements may be exaggerated for clarity and convenience.

DETAILED DESCRIPTION

The following detailed description is provided to assist the reader in gaining a comprehensive understanding of the media, methods, apparatuses, and systems described herein. Accordingly, various changes, modifications, and equivalents of the media, methods, apparatuses, and systems described herein will be suggested to those of ordinary skill in the art. Also, descriptions of well-known functions and structures may be omitted for increased clarity and conciseness.

Figure 1:
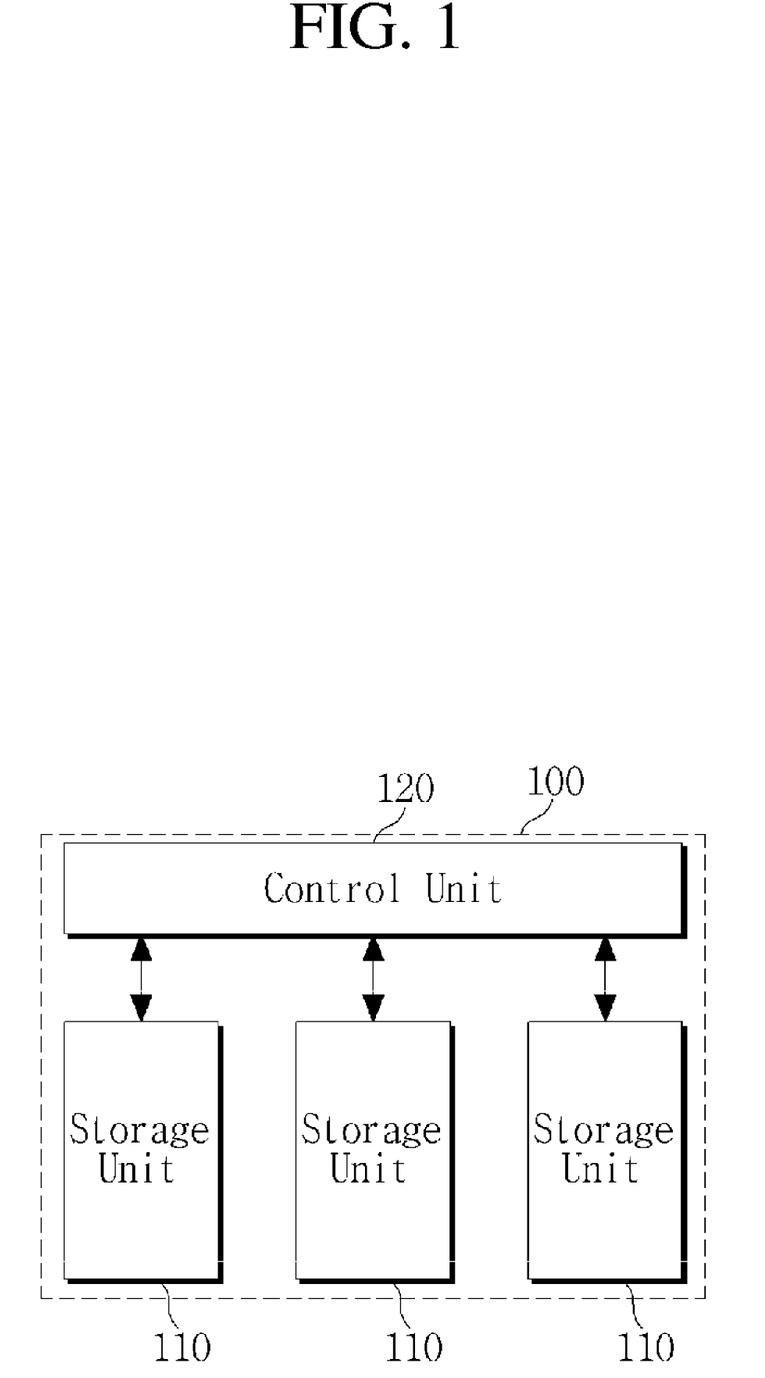
FIG. 1 is a block diagram illustrating an exemplary apparatus to manage data stability.

FIG. 1 illustrates an exemplary apparatus 100 to manage data stability. The apparatus 100 may include a plurality of storage units 110 and a control unit 120.

The plurality of storage units 110 may be physically and/or logically divided data storage means. The storage units 110 may have the same memory size or different memory sizes from one another.

For example, when the storage units 110 are physically divided, one storage unit 110 may be a hard-disk drive ("HDD") and the others may be a different type of memory device such as a NAND Flash. When the storage units 110 are logically divided from one another, the storage units 110 may be logical drives (e.g., a C: drive, a D: drive, an E: drive, etc.) obtained by logically partitioning a HDD.

When protected data is stored in a particular address row of at least one of the storage units 110, the control unit 120 selects another of the storage units 110 that does not store protected data and controls the selected storage unit to store relevance data related to the protected data in an address row that may be the same as the particular address row of the storage unit that stores the protected data. Here, the term "address row" may refer to a row formed of access addresses or memory block numbers for accessing each of the storage units 110.

The control unit 120 dynamically manages address rows of the storage units 110 by classifying the address rows into protected rows and non-protected rows and controls protected data by always storing the protected data in the protected row. The non-protected data may be stored in either protected rows or non-protected rows.

Figure 2:
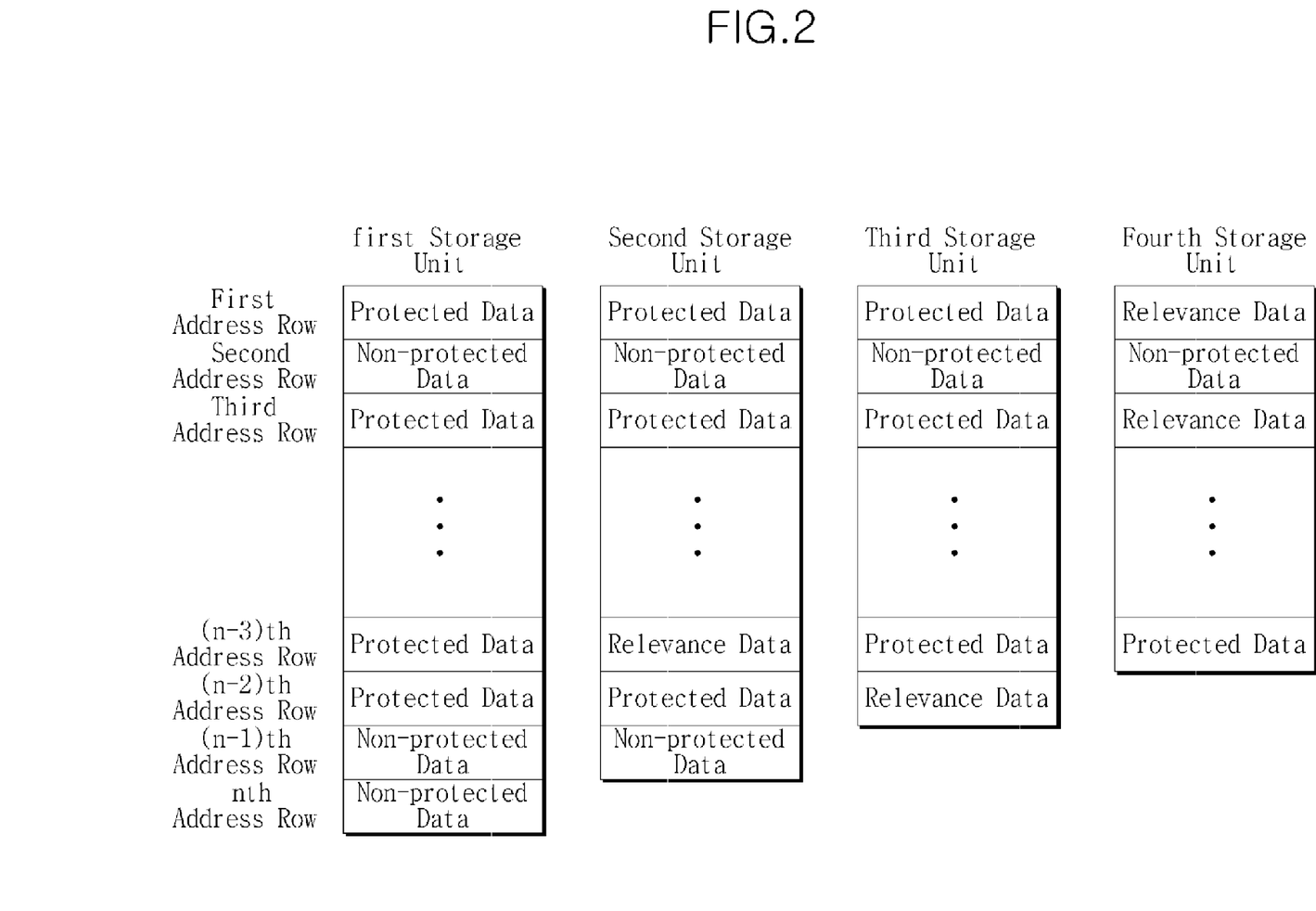
FIG. 2 is a diagram illustrating exemplary address rows of four storage units with different memory sizes.

FIG. 2 illustrates exemplary address rows of four storage units with different memory sizes. In FIG. 2, a first storage unit may be formed of "n" address rows, a second storage unit may be formed of "n−1" address rows, a third storage unit may be formed of "n−2" address rows, and fourth storage unit may be formed of "n−3" address rows.

As shown in FIG. 2, the first address row, the third address row, a "(n−3)th" address row, and a "(n−2)th" address row are protected rows that store protected data, and the second address row, a "(n−1)th" address row, and an "nth" address row are non-protected rows that store non-protected data. Each storage unit may use the same memory address for the same address row.

The relevance data may be, for example, parity information. The parity information may be a value obtained by performing a logical operation on bits of each memory address of memory blocks included in protected address rows in each storage unit 110.

For example, when a storage unit stores parity information in a particular protected address row, the parity information may be obtained by performing an exclusive OR ("XOR") operation on data in the same address row of the remaining storage units.

Figure 3:
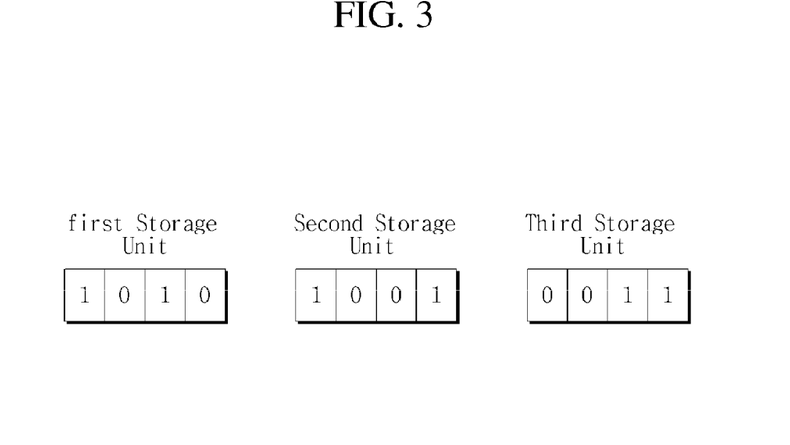
FIG. 3 is a diagram illustrating an example of parity information.

FIG. 3 illustrates examples of parity information. Referring to FIG. 3, when data stored in an address row of a first storage unit is "1010" and data stored in the same address row of a second storage unit is "1001," parity information stored in the same address row of a third storage unit is "0011," may be obtained by performing an XOR operation on "1010" and "1001."

When the data "1001" stored in the address row of the second storage unit is damaged, the damaged data may be recovered by use of the data "1010" stored in the same address row of the first storage unit, the data "0011" stored in the same address row of the third storage unit, and the properties of the XOR operation.

When data stored in a particular address row of each of three or more storage units and parity information in the same address row of another storage unit is used to recover damaged data stored in the same address row of a storage unit, the above-described parity calculation may be compounded (i.e., multiple logic combination), and thus a detailed description of this case is omitted.

Accordingly, when there is damaged data in a particular protected address row of a physically and/or logically divided storage unit, the damaged data may be recovered by use of relevance data in the same address row of another storage unit. Thus, less memory resources are used for data back-up as compared to conventional data back-up and recovery techniques, and data stability can be effectively managed with a simple configuration.

Figure 4:
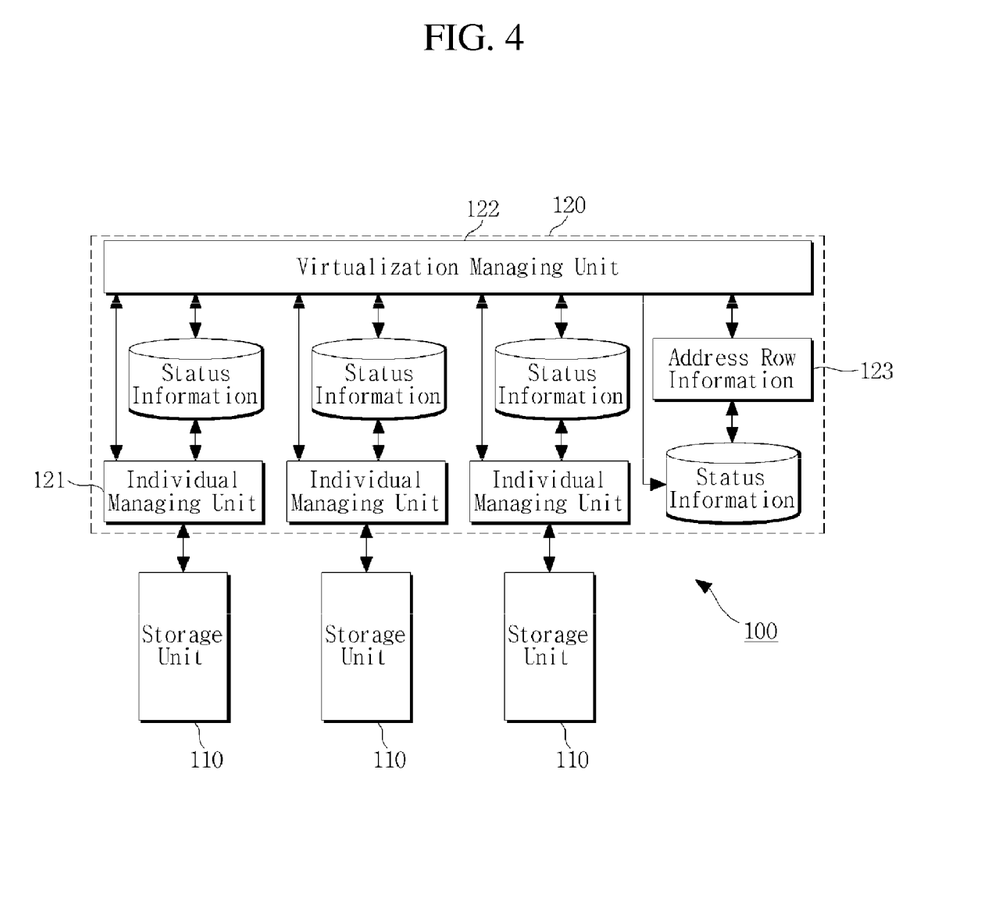
FIG. 4 is a block diagram illustrating another exemplary apparatus to manage data stability.

FIG. 4 another exemplary apparatus 100 to manage data stability. Referring to FIG. 4, a control unit 120 may include a plurality of individual managing units 121 and a virtualization managing unit 122.

The individual managing units 121 are coupled to a plurality of storage units 110, respectively, and manage address rows of the coupled storage units 110. That is, the individual managing units 121 may manage a use status of memory blocks of the coupled storage units 110.

For example, each individual managing unit 121 may dynamically control status information to indicate whether data stored in the address rows of the storage unit 110 is protected data, non-protected data, relevance data, or that the address row is unused.

Figure 5:
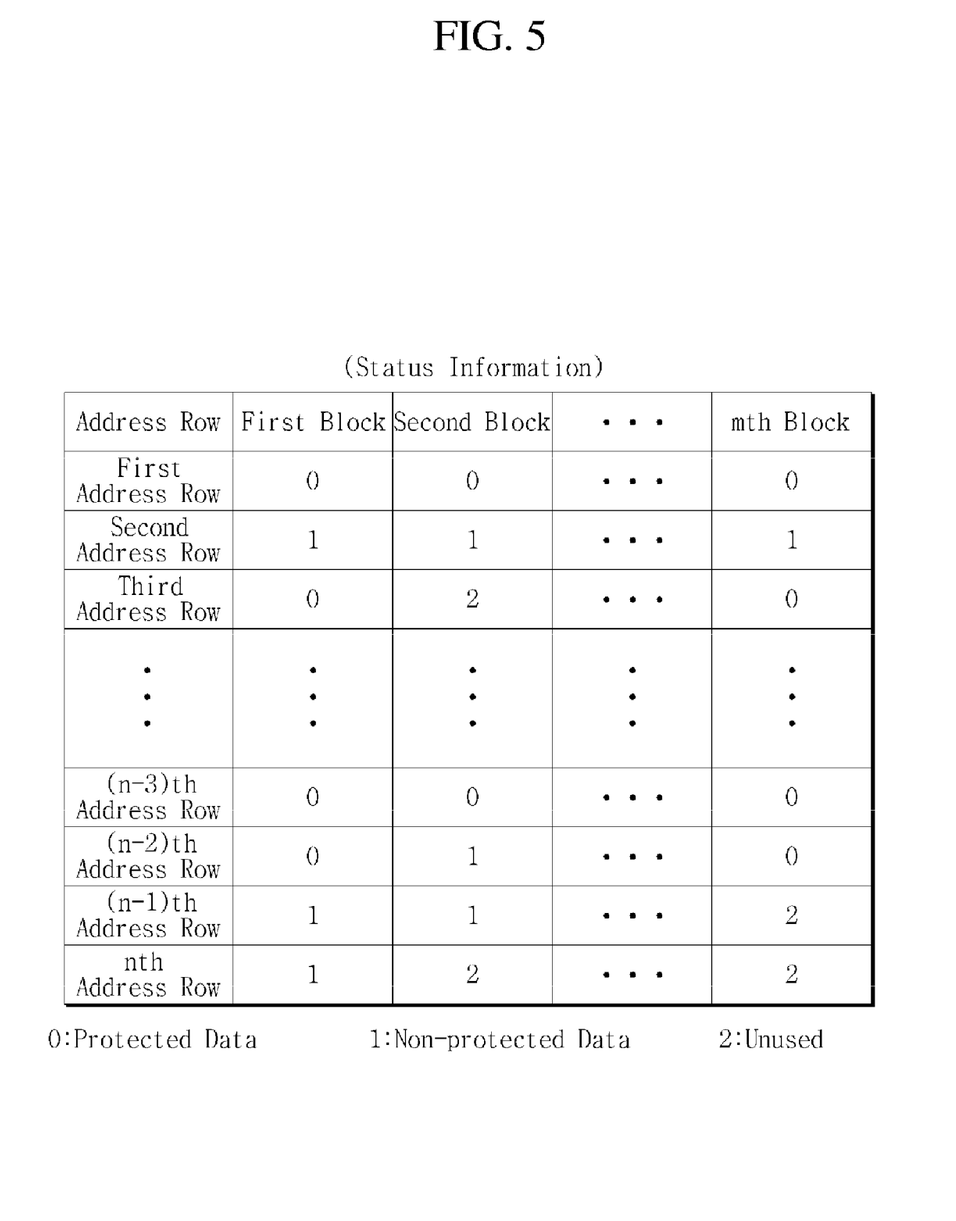
FIG. 5 is a table showing an example of status information.

FIG. 5 illustrates exemplary status information. Referring to FIG. 5, data stored in a first block, a second block, and "mth" blocks of a first address row of a storage unit 110 are protected data. Data stored in a first block, a second block, and "mth" blocks of a second address row are non-protected data. Data stored in a first block of an "nth" address row is non-protected data and data stored in a second block and "mth" blocks of the "nth" address row may be unused.

That is, when there is a change of data (e.g., storing, altering, or deleting of data) in a memory bock of an address row of the storage unit 110, the individual control unit 121 learns the use status of each memory block in each address row and reflects the learned use status in the status information, to thereby dynamically control the status information. The status information may be referred to when the virtualization managing unit 122 stores, alters, or deletes data.

The virtualization managing unit 122 may control each of the individual managing units 121 and may manage all of the storage units 110 as a single virtual device by virtualizing all of the storage units 110. That is, the virtualization managing unit 122 allows the plurality of storage units 110 to be utilized as a single storage unit by use of the status information which is dynamically managed by each of the individual managing units 121.

For example, suppose the size of a first storage unit 1 is 1024 MB, the size of a second storage unit is 2048 MB, and the size of a third storage unit is 1024 MB, the virtualization managing unit 122 may manage the three storage units as a single memory with a size of 4096 MB.

The virtualization managing unit 122 determines which storage unit 110 will have data stored therein, which will have its data altered, and which will have its data deleted, and determines memory addresses or blocks of the corresponding storage unit 110 with reference to the status information managed by each individual managing unit 121. Then, when the virtualization managing unit 122 issues a control command to the individual managing unit 121 which manages the determined storage unit 110, the individual managing unit 121 stores, alters, or deletes data in the corresponding storage unit 110 according to the determined memory address or block, and then updates the status information.

Therefore, the individual managing units 121 coupled with the storage units 110 dynamically manage the status information of address rows consisting of access addresses or memory block numbers for accessing each storage unit 110. In addition, the virtualization managing unit 122 manages the plurality of storage units 110 by virtualizing all of the storage units 110 as a single memory with reference to the status information dynamically managed by each of the individual managing units 121.

The control unit 120 may further include an address row managing unit 123 that dynamically manages the address rows by classifying them into protected rows and non-protected rows. The protected rows and the non-protected rows may be dynamically defined each time a user request is received. In the initial state, all address rows of each storage unit 110 may be set as non-protected rows that are used as memory blocks for storing non-protected files. When there is a request from a user to store protected data, the virtualization managing unit 122 searches for empty memory blocks from the address rows set as protected rows with reference to address row information that is dynamically managed by the address row managing unit 123. The virtualization managing unit 122 issues a command to the individual managing unit 121 to manage the storage unit 110 that includes the empty memory block and to store the protected data in the empty memory block.

When the virtualization managing unit 122 refers to the address row information dynamically managed by the address row managing unit 123 in response to a user request, and protected rows are not set in the address row information, the virtualization managing unit 122 issues a command to the address row managing unit 123 to newly generate protected rows. The address row managing unit 123 generates protected rows and sets the protected rows in the address row information.

Figure 6:
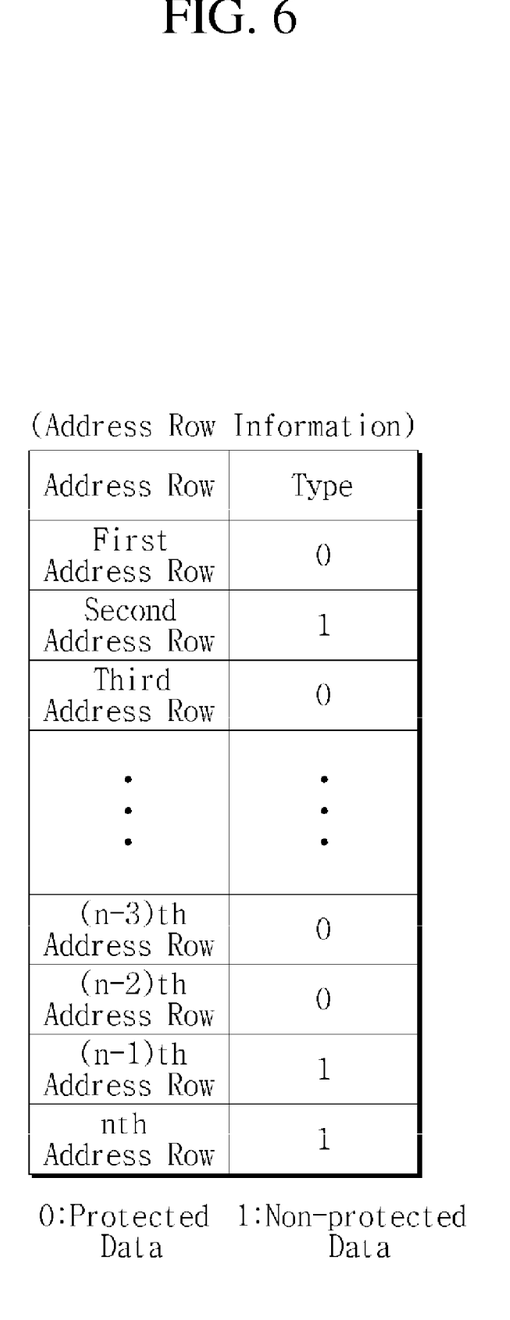
FIG. 6 is a diagram illustrating an example of address row information.

FIG. 6 illustrates an example of address row information. Referring to FIG. 6, a first address row, a third address row, a "(n−3)th" address row, and a "(n−2)th" address rows are set as protected rows and a second address row, a "(n−1)th" address row, and an "nth" address rows are set as non-protected rows.

When data stored in a particular protected address row of a storage unit 110 is damaged, the virtualization managing unit 122 recovers the damaged data using relevance data stored in an address row of another storage unit 110 corresponding to the particular address row. The damaged data recovery procedure is the same as described above.

The apparatus to manage data stability classifies the address rows of the physically and/or logically divided plurality of storage units into protected rows and non-protected rows and dynamically manage protected data to be stored in the protected rows. In addition, when data stored in a particular protected address row of a storage unit is damaged, relevance data stored in the same address row of another storage unit is used to recover the damaged data. Thus, with a simple structure, data stability can be effectively managed.

Figure 7:
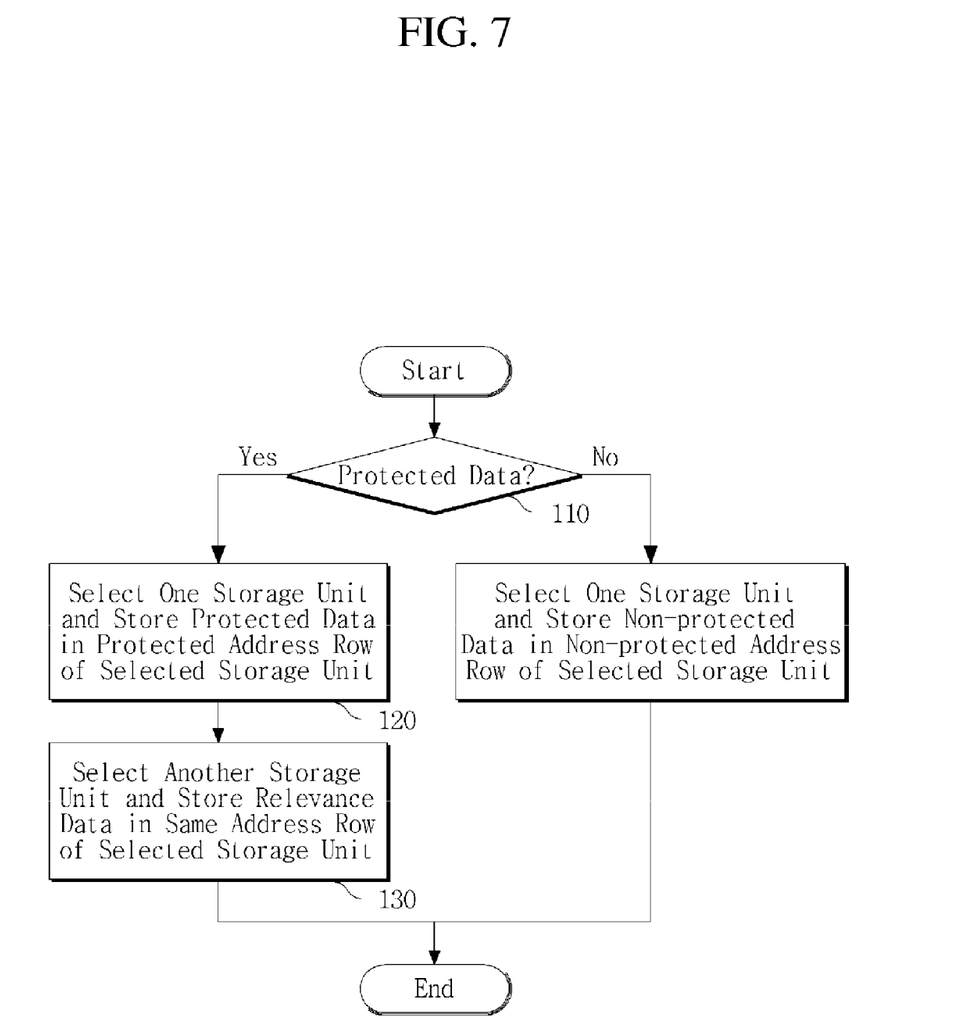
FIG. 7 is a flowchart illustrating an exemplary method of storing data.
Figure 8:
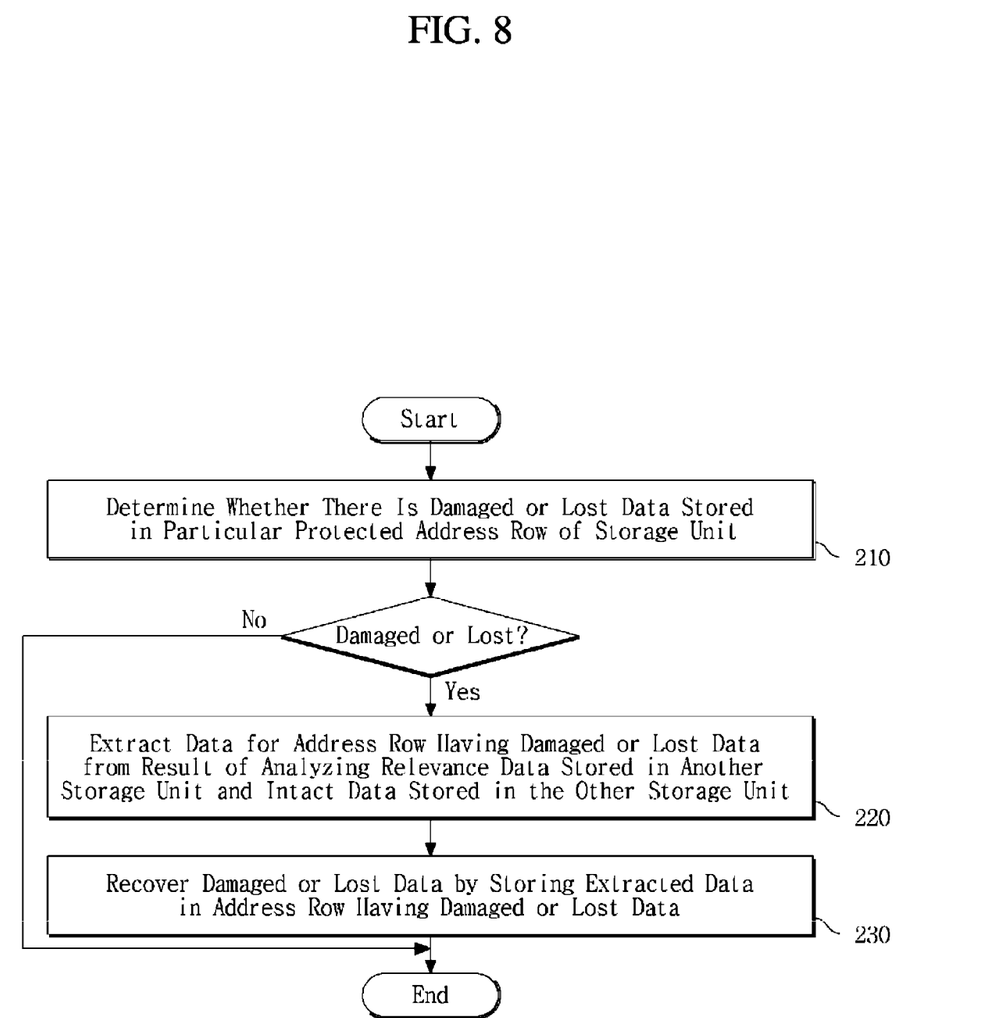
FIG. 8 is a flowchart illustrating an exemplary method of recovering data.

FIGS. 7 and 8 illustrate exemplary procedures for storing and recovering data in a data stability managing apparatus as described below.

FIG. 7 illustrates an exemplary method of storing data and FIG. 8 illustrates an exemplary method of recovering data.

Referring to FIG. 7, a data stability managing apparatus may determine whether data requested to be stored in response to a user request is protected data (110).

When it is determined that the requested data is protected data, the data stability managing apparatus selects one of a plurality of storage units and stores the protected data in an address row set as a protected row among a plurality of address rows of the selected storage unit (120).

When it is determined the requested data is non-protected data, the data stability managing apparatus selects one of the plurality of storage units and stores the non-protected data in an address row set as a non-protected row among the plurality of address rows of the selected storage unit.

Once the protected data is stored in the selected storage unit, the data stability managing apparatus selects another storage unit and stores relevance data related to the stored protected data in the same address row of the selected storage unit. The protected data may be stored in an unused memory block of the address row set as a protected row of the selected storage unit.

The relevance data may be, for example, parity information. The parity information may be obtained by performing a logical operation on bits of a memory address of each memory block included in the address row set as the protected row of the storage unit. The procedure for obtaining the parity information is the same as described above.

Accordingly, the protected data is stored in a particular address row of at least one storage unit among a plurality of physically and/or logically divided storage units, another storage unit is selected, and the relevance data related to the protected data is stored in the same address row of the selected storage unit. Hence, when the protected data stored in the particular address row is damaged, the damaged data may be recovered by use of the relevance data.

Referring to FIG. 8, the data stability managing apparatus may determine whether data stored in a particular address row set as a protected row of one of a plurality of storage units is damaged (210).

When it is determined that the data is damaged (210), the data stability managing apparatus extracts data of the address row containing the damaged data by analyzing relevance data stored in a corresponding address row of another storage unit and analyzing intact data stored in corresponding address rows of remaining storage units whose data is not damaged (220).

The relevance data may be, for example, parity information. The parity information may be a value obtained by performing a logical operation on bits of each memory address of memory blocks included in each of the protected address row. The procedure for obtaining the parity information is the same as described above. Similarly, the procedure for extracting data damaged in a particular address row of a specific storage unit by using relevance data and undamaged data stored in the same address row of different storage units is the same described above and.

Once the damaged data is generated (220), the data stability managing apparatus recovers the damaged data by storing the generated data in the address row in which the damaged data is stored (230). In this manner, damaged data in the particular address row of the storage unit may be recovered by use of the relevance data and undamaged data stored in the same address row.

Hence, address rows of a plurality of physically and/or logically divided storage units are classified into protected and non-protected address rows, protected data is dynamically managed to be stored in the protected address rows, and when there is damage to data stored in a particular protected address row of one of the storage units, the damaged data is recovered by use of relevance data stored in a corresponding address row of another storage unit. Thus, with a simple configuration, effective data stability maintenance can be achieved.

A number of exemplary embodiments have been described above. Nevertheless, it is understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus to manage data stability, comprising:
a plurality of storage units;
a controller to determine when protected data is stored in a particular address row of at least one of the plurality of storage units, to select another storage unit of the plurality of storage units to store the protected data, and to store relevance data related to the protected data in the same address row of the selected storage unit wherein the controller comprises a plurality of individual managing units respectively coupled to the plurality of storage units to control address rows of each of the plurality of storage units and a virtualization manager to control each of the plurality of individual managing units and to manage the plurality of storage units by virtualizing the plurality of storage units as a single device.

2. The apparatus of claim 1, the controller further comprises an address row manager to manage the address rows of each of the plurality of storage units dynamically by classifying the address rows into protected rows and non-protected rows.

3. The apparatus of claim 2, wherein when there is damaged data in a particular address row of one of the plurality of storage units among the protected rows managed by the address row manager, the virtualization manager recovers the damaged data using the relevance data stored in the same address row of another storage unit.

4. The apparatus of claim 2, wherein the address row manager generates protected rows and sets the protected rows in the address row information.

5. The apparatus of claim 1, wherein the plurality of individual managing units dynamically manage status information configured to indicate whether data stored in each address row of each storage unit is protected, non-protected, relevance data, and whether the address row is unused.

6. The apparatus of claim 1, wherein the relevance data is parity information.

7. The apparatus of claim 6, wherein the parity information is stored in a particular address row of one storage unit and is obtained by performing an exclusive OR operation on data included in the same address row of the other storage units.

8. The apparatus of claim 1, wherein the storage units are physically or logically divided.

9. The apparatus of claim 1, wherein the storage units are physically and logically divided.

10. A method of storing data in a data stability management system, the method comprising:
determining by a data stability managing apparatus when data requested to be stored is protected data;
selecting by the data stability managing apparatus one of a plurality of storage units when data requested to be stored is protected data and storing the protected data in an address row that is set to be protected from among a plurality of address rows of the selected data storage unit; and
selecting by the data stability managing apparatus another storage unit when the protected data is stored and storing relevance data related to the protected data in a protected address row of the other storage unit corresponding to the protected address row where the protected data was stored of the selected data storage unit.

11. The method of claim 10, wherein the relevance data is parity information.

12. The method of claim 11, wherein the parity information is stored in a particular address row of one storage unit and is obtained by performing an exclusive OR operation on data included in corresponding address rows of the other storage units.

13. The method of claim 10, wherein the protected data is stored in an unused memory block of the address row set to be protected of the selected storage unit.

14. A method of recovering data comprising:
determining by a data stability managing apparatus when damaged data is stored in a particular protected address row of one of a plurality storage units;
extracting data by the data stability managing apparatus to be stored in the particular address row when stored damaged data exists in the storage unit by analyzing the relevance data stored in a corresponding address row of another storage unit of the plurality of storage units and analyzing intact data stored in a corresponding address row of remaining storage units of the plurality of storage units where non-damaged data is stored.

15. The method of claim 14, wherein the relevance data is parity information.

16. The method of claim 15, wherein the parity information is stored in a particular address row of one storage unit and is obtained by performing an exclusive OR operation on data included in the same address row of the other storage units.

* * * * *